US010864919B2

(12) United States Patent
Nagasawa (10) Patent No.: US 10,864,919 B2
(45) Date of Patent: Dec. 15, 2020

(54) ALARM APPARATUS FOR A VEHICLE WITH DRIVING CONTROL

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 267 days.

(21) Appl. No.: 15/992,824

(22) Filed: May 30, 2018

(65) Prior Publication Data

US 2019/0077415 A1 Mar. 14, 2019

(30) Foreign Application Priority Data

Sep. 8, 2017 (JP) ................................. 2017-173085

(51) Int. Cl.
| | |
|---|---|
| *B60W 50/14* | (2020.01) |
| *B60W 30/18* | (2012.01) |
| *B60W 10/04* | (2006.01) |
| *B60Q 9/00* | (2006.01) |
| *B60W 10/18* | (2012.01) |
| *B60W 10/00* | (2006.01) |

(52) U.S. Cl.
CPC ............. *B60W 50/14* (2013.01); *B60Q 9/00* (2013.01); *B60W 10/00* (2013.01); *B60W 10/18* (2013.01); *B60W 30/18* (2013.01); *B60W 2554/00* (2020.02); *B60W 2710/18* (2013.01); *B60W 2720/106* (2013.01)

(58) Field of Classification Search
CPC ........... B60W 50/14; B60W 2050/143; B60W 2050/146; B60W 50/16
See application file for complete search history.

(56) References Cited

U.S. PATENT DOCUMENTS

| 8,681,016 | B2* | 3/2014 | Lee ................... B60W 30/143 340/904 |
| 8,718,861 | B1* | 5/2014 | Montemerlo ....... B60W 50/082 701/26 |
| 9,704,397 | B1* | 7/2017 | Bjorklund ............ G08G 1/0965 |
| 9,989,963 | B2* | 6/2018 | Perkins ............... B60W 50/082 |
| 10,093,322 | B2* | 10/2018 | Gordon ................. B60W 50/14 |

(Continued)

FOREIGN PATENT DOCUMENTS

| JP | 2007-091028 A | 4/2007 |
| JP | 2008-077309 A | 4/2008 |

(Continued)

OTHER PUBLICATIONS

Japanese Office Action dated Mar. 19, 2019 for JP 2017-173085 (4 pages in Japanese with English translation).

*Primary Examiner* — Todd Melton (74) *Attorney, Agent, or Firm* — Smith, Gambrell & Russell, LLP (57) ABSTRACT

An alarm apparatus to be equipped in a vehicle includes a driving controller. The driving controller is configured to perform automated driving control or driving support control of the vehicle, and to perform driving control of the vehicle. When a detector of the vehicle detects another vehicle approximately behind the vehicle, the driving controller performs acceleration control of the vehicle while the automated driving control or the driving support control is performed.

15 Claims, 6 Drawing Sheets

(56) References Cited

U.S. PATENT DOCUMENTS

| | | | |
|---|---|---|---|
| 10,166,996 B2* | 1/2019 | Ishihara | B60W 50/14 |
| 10,358,129 B2* | 7/2019 | Payne | B60W 30/18009 |
| 2011/0032119 A1* | 2/2011 | Pfeiffer | B60W 50/16 |
| | | | 340/905 |
| 2014/0142839 A1 | 5/2014 | Kaminade | |

FOREIGN PATENT DOCUMENTS

| | | |
|---|---|---|
| JP | 2012-001042 A | 1/2012 |
| JP | 2012-017717 A | 1/2012 |
| JP | 2017-091115 A | 5/2017 |
| WO | 2012/172632 A1 | 12/2012 |

\* cited by examiner

ALARM APPARATUS FOR A VEHICLE WITH DRIVING CONTROL

CROSS-REFERENCE TO RELATED APPLICATIONS

The present application claims priority from Japanese Patent Application No. 2017-173085 filed on Sep. 8, 2017, the entire contents of which are hereby incorporated by reference.

BACKGROUND

1. Technical Field

The present invention relates to an alarm apparatus, more specifically to an alarm apparatus capable of encouraging a passenger to recognize a running environment during automated driving or driving support of a vehicle.

2. Related Art

There has been known a vehicular display device which allows a passenger to feel at ease during automated driving of an automated driving vehicle including a HUD device configured to display an obstacle mark, an attention mark, and a traveling direction mark on the landscape in front of the vehicle when an obstacle approaches the vehicle, as disclosed in, for example, Japanese Unexamined Patent Application Publication No. 2017-091115.

SUMMARY OF THE INVENTION

An aspect of the present invention provides an alarm apparatus to be equipped in a vehicle. The apparatus includes a driving controller. The driving controller is configured to perform automated driving control or driving support control of the vehicle, and to perform driving control of the vehicle. When a detector of the vehicle detects another vehicle approximately behind the vehicle, the driving controller performs acceleration control of the vehicle while the automated driving control or the driving support control is performed.

DETAILED DESCRIPTION

Figure 1:
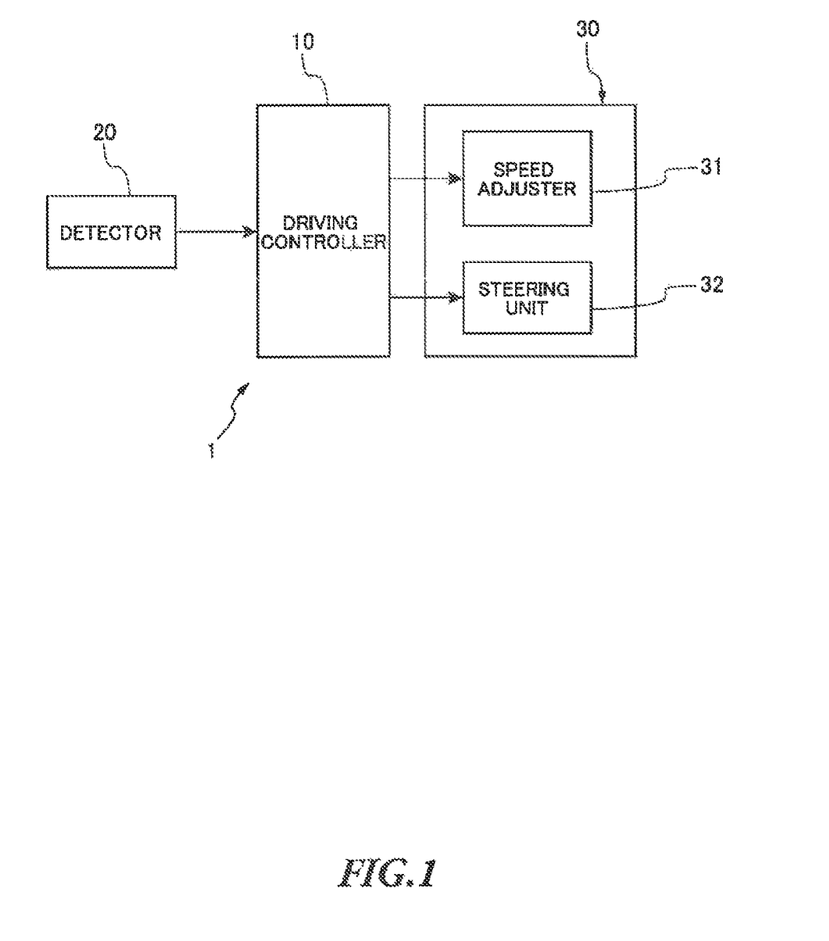
FIG. 1 is a block diagram illustrating an alarm apparatus according to an example of the present invention.
Figure 2:
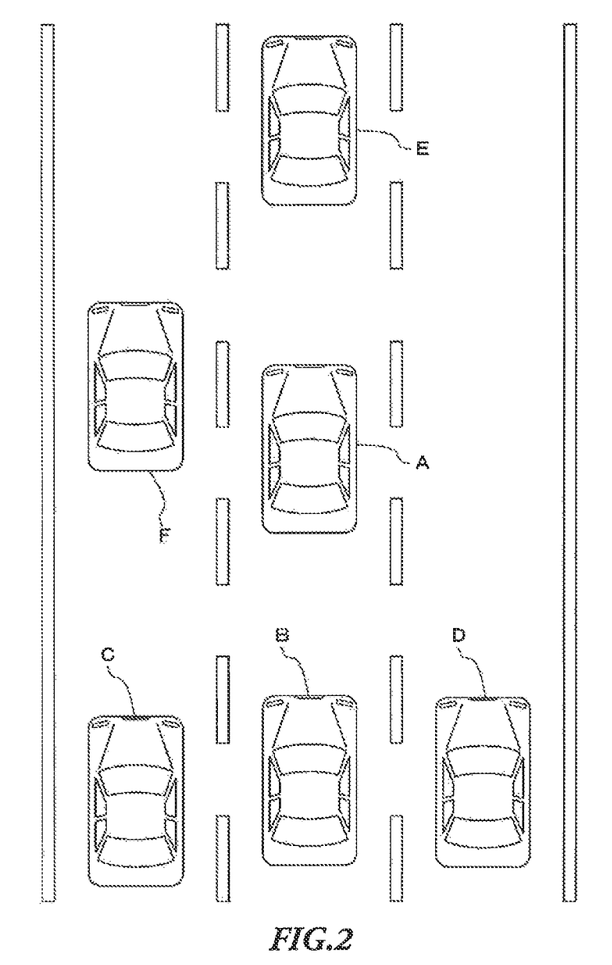
FIG. 2 is a schematic overhead view illustrating a running situation surrounding a vehicle using the alarm apparatus illustrated in FIG. 1.
Figure 3:
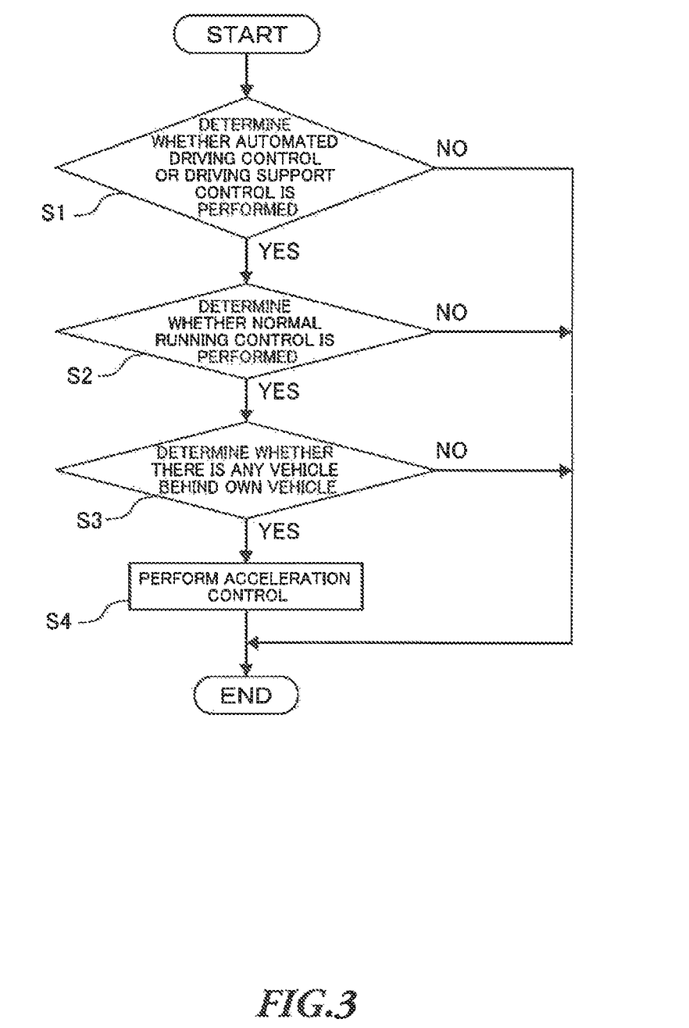
FIG. 3 is a flowchart illustrating a process of control when the alarm apparatus illustrated in FIG. 1 is used.

Hereinafter, an example of the alarm apparatus according to the present invention will be described with reference to FIGS. 1 to 3. Here, FIG. 1 is a block diagram illustrating an alarm apparatus 1 according to an example of the present invention. FIG. 2 is a schematic overhead view illustrating a running situation surrounding a vehicle using the alarm apparatus 1 illustrated in FIG. 1. FIG. 3 is a flowchart illustrating a process of control when the alarm apparatus 1 illustrated in FIG. 1 is used.

During manual driving, the passenger as a driver watches the surrounding environment ahead via a front window. Meanwhile, during the automated driving or the driving support, the initiative of the driving is passed from the passenger to the vehicle, and therefore the passenger does not need to watch the surrounding environment carefully, and may diminish the attention to the surrounding environment.

Here, the conventional vehicular display device as described above can display to call the passenger's attention when there is an object to be coped with, such as a vehicle running in front of the vehicle during the automated driving or the driving support. However, when there is no object to be coped, that is, the vehicle is simply driven in a normal driving mode during the automated driving or the driving support, the vehicular display device does not display to call the attention of the passenger.

It is desirable to provide an alarm apparatus capable of encouraging a passenger to recognize the running environment during the automated driving or the driving support, by alarming the passenger depending on the running environment, even though the passenger does not watch the surrounding environment.

As illustrated in FIG. 1, the alarm apparatus 1 includes a driving controller 10. A vehicle equipped with the alarm apparatus 1 includes a detector 20 and a vehicle driving unit 30 as illustrated in FIG. 1.

With the present example, the detector 20 can output information detected by the detector 20 to the driving controller 10, and the driving controller 10 can output a driving signal to the vehicle driving unit 30.

The driving controller 10 performs automated driving control or advanced driving support control of the vehicle, and also performs driving control of the vehicle by outputting a driving signal to the vehicle controller 30. The automated driving control and the advanced driving support control of the vehicle are to drive the vehicle while all or most initiative to increase and decrease the speed and to steer the vehicle is passed to the vehicle side. Basically, the automated driving control and the advanced driving support control performed by the driving controller 10 are categorized into a plurality of levels, depending on a degree of the initiative. The driving controller 10 may change the driving control level depending on a surrounding environment and so forth. As this driving control level, an automated driving level defined by SAE J3016 (2016) which is adopted by, for example, NHTSA, may be used. Here, SAE J3016 defines SAE levels 3 to 5 as so-called "automated driving." With the present example, the driving controller 10 continues to create and update a running scenario depending on the surrounding environment changing over time. Here, information on the surrounding environment detected by the detector 20 may be used to create the running scenario. As the driving controller 10, an arithmetic processing unit used in a common automated driving vehicle or driving support vehicle may be used. Although the driving controller 10 according to the present example may be an existing arithmetic processing unit, it may perform specific driving control of the vehicle under a specific running environment, as described later with reference to FIGS. 2 and 3.

The vehicle driving unit 30 includes a speed adjuster 31 and a steering unit 32. The speed adjuster 31 accelerates and brakes the vehicle to adjust the speed of the vehicle. The steering unit 32 adjusts the directions of the wheels to adjust the traveling direction of the vehicle. Examples of the speed adjuster 31 may include an accelerator and a brake operated by the passenger during the manual driving, and an ECU (engine control unit) to control the engine by the vehicle side. Examples of the steering unit 32 may include a steering device operated by the passenger, and a steering-by-wire system controlled by the vehicle side.

The detector 20 is configured to detect the situation, state, and environment outside the vehicle. In addition, the detector 20 is configured to detect at least the surrounding environment of the vehicle, preferably, the state of the vehicle and the states of other vehicles. Examples of object to be detected in the surrounding environment of the vehicle may include other vehicles and obstacles. Examples of object to be detected as the vehicle state may include the positions, traveling directions, speeds and accelerations of the own vehicle and other vehicles. As the detector 20, specifically, various sensors and cameras may be used. To detect the surrounding environment, information may be acquired from the outside via a communication device.

Now, the running environment surrounding the vehicle using the alarm device 1 according to the present example will be described with reference to FIG. 2. A plurality of vehicles illustrated in FIG. 2 run forward as the top in the drawing. A vehicle A illustrated in an approximately middle portion of FIG. 2 is the own vehicle, and vehicles B, C, D, E and F are other vehicles running around the vehicle A. The vehicle B, C, and D run behind the vehicle A. The vehicle E runs in front of the vehicle A. The vehicle F runs beside the vehicle A.

Here, the regions for the vehicles running in front of, behind, and beside the vehicle A may be appropriately defined. For example, the regions may be defined for various sensors and cameras mounted in an automated driving vehicle which can detect objects behind, in front of, and beside the vehicle. That is, a vehicle running behind the vehicle A is detected by a rear detection sensor; a vehicle running in front of the vehicle A is detected by a front detection sensor; and a vehicle running beside the vehicle A is detected by a side detection sensor.

The automated driving control or the driving support control includes coping control to avoid a risk factor caused by various objects such as the vehicles running around the vehicle A and obstacles may be performed, and also normal running control, which is driving control to drive the vehicle A in a normal driving mode when there is no or a little risk factor to be avoided and therefore the coping control is not required may be performed. The vehicle A maintains a certain distance from the vehicles B, C, D, and F as illustrated in FIG. 2 to allow them to run safely, and therefore it is not a situation that there is a risk of a collision with the vehicle B, C, D, and F unless the vehicle A quickly avoids the vehicles. That is, in the running environment illustrated in FIG. 2, the normal running control is performed, that is, the vehicle A can run in the normal running mode while the automated driving control or the driving support control is performed. Here, "risk factor" is caused by various objects detected by the detector 20, and the safety running cannot be maintained unless the risk factor is avoided.

When the vehicle runs on, for example, a driveway while the drive controller 10 performs the automated driving control or the advanced driving support control, the surrounding environment of the vehicle changes less than when the vehicle runs on a general road where there are cross points, other vehicles, pedestrians, and so forth. However, even during the automated driving control or the driving support control, the passenger is required to watch the surrounding environment in the same way as during the manual driving. However, it is difficult for the passenger to continue to watch the monotonous surrounding environment with maintaining the passenger's concentration. When the passenger decreases in concentration to watch the surrounding environment, the passenger may not notice a visual display to call the passenger's attention by using a HUD in a vehicle compartment.

Next, a process of the control when the alarm apparatus 1 illustrated in FIG. 1 is used will be described with reference to the flowchart illustrated in FIG. 3.

First, the driving controller 10 determines whether the automatic driving control or the driving support control is performed, based on a driving signal outputted to the vehicle driving unit 30 to increase or decrease the speed of the vehicle and steer the vehicle (step S1). The driving controller 10 merely determines whether the predetermined control by the driving controller 10 is performed in this step, and therefore can complete the determination based on whether the driving signal is outputted. When the driving controller 10 outputs the driving signal to the vehicle driving unit 30 to allow the vehicle to take all or most initiative to drive the vehicle, the driving controller 10 can determine that the vehicle is under the automated driving control or the driving support control, and moves the step to the next step (step S1/YES). Meanwhile, when the driving signal is not outputted, the process ends (step S1/NO).

Next, the driving controller 10 determines whether the normal running control is performed while the automated driving control or the driving support control is performed (step S2). In the same way as in the step S1, the driving controller 10 merely determines whether the predetermined control by the driving controller 10 is performed in the step 2. Therefore, when the driving signal to perform the normal running control is outputted to the vehicle driving unit 30, or when there is no risk factor which requires the coping control to avoid an obstacle in the surrounding environment of the vehicle, the driving controller 10 can determine that the vehicle is under the normal driving control, and moves the step to the next step (step S2/YES). On the other hand, when the driving signal to perform the normal running control is not outputted, or when the detector 20 detects an obstacle, and then a signal to perform the coping control is outputted, the process ends (step S2/NO).

Next, the driving controller 10 determines whether there is any vehicle behind the own vehicle (step S3). In the step S3, when the detector 20 detects a vehicle behind the own vehicle, the step moves to the next step (step S3/YES). On the other hand, when the detector 20 detects no vehicle behind the own vehicle, the process ends while the normal running control is maintained (step S3/NO). Here, an example of vehicles running behind the own vehicle may be a vehicle B, C, or D illustrated in FIG. 2. With the present example, any vehicle is regarded as the vehicle running behind the own vehicle as long as the vehicle can be detected by a rear detector for detecting the rear of the own vehicle regardless of lane.

When determining that there is a vehicle behind the own vehicle (step S3/YES), the driving controller 10 outputs a driving signal to the vehicle driving unit 30 to perform the acceleration control of the own vehicle (step S4). By performing the acceleration control in this step S4, it is possible to allows the passenger to bodily sense the acceleration when the detector 20 detects a vehicle behind the own vehicle such as the vehicle B, C, or D illustrated in FIG. 2. This bodily sensation of the passenger serves as an alarm without visual sense and acoustic sense, and therefore the passenger pays attention to the state and situation of the own vehicle to know what happened. That is, the passenger will pay attention to the running environment of the own vehicle. Since under the normal running control, the running environment does not change so much, the passenger is likely to decrease in concentration to watch the surrounding environment. Even though the passenger does not watch the surrounding environment, or decreases in the accuracy of the watch, it is possible to encourage the passenger to recognize the running environment of the vehicle by the alarm of the alarm apparatus 1.

Here, with the present example, the acceleration control of the own vehicle is performed when the own vehicle runs under the normal running control during the automated driving control or the advanced driving support control. However, this is by no means limiting. The speed adjustment control such as the acceleration control of the own vehicle may be performed when a predetermined object to be avoided by the coping control is detected, or the coping control is performed. By this means, it is possible to encourage the passenger to watch the surrounding environment under the condition where the passenger should pay more attention to the surrounding environment than when the vehicle is under the normal running control.

When an object such as another vehicle or an obstacle is detected by an appropriate sensor or camera, the coping control is required to avoid the object by increasing or decreasing the speed, or steering the own vehicle. In consideration of the possibility that the vehicle side passes the initiative of the driving to the passenger side in an emergency, if the passenger is not encouraged to recognize the running environment until an object approaches the own vehicle and then the coping control is started, it may be too late for the passenger manually driving the own vehicle to avoid the object. Therefore, the alarm apparatus according to the present invention can perform the acceleration control of the own vehicle under the normal running control to encourage the passenger to recognize the running environment. By this means, it is possible to allow the passenger to prepare for a situation requiring the coping control.

Here, when the coping control is incorporated into the driving scenario, or the coping control is started, it is preferred that control of forcibly cancelling the increase in the speed of the vehicle is overwritten to the control currently being performed. By this means, the coping control is performed preferentially to the control currently being performed. To be more specific, it is preferred that when the coping control is required or performed, the increase in the speed of the own vehicle is stopped, and the own vehicle is driven in the mode before the acceleration control is performed. By this means, it is possible to substantially return the state of the own vehicle to the state where the normal running control is performed before the acceleration control. That is, it is possible to reduce the difference between the running environment before the acceleration control and the running environment requiring the coping control by cancelling the acceleration control, and therefore to allow the passenger to recognize the running environment in a seamless manner without a feeling of strangeness. In this case, when the object to be avoided is detected or the coping control is performed, it is preferred that the above-described overwriting is performed after the speed adjustment control of the own vehicle is performed. By this means, it is possible to encourage the passenger to recognize the running environment without a feeling of strangeness as well as to recover the concentration to watch the surrounding environment.

With the present example, the driving controller 10 determines whether the automatic driving control or the driving support control is performed in the step S1, and determines whether the normal running control is performed in the step S2. However, this is by no means limiting. The step 1 and the step S2 may be collectively performed in one step as long as it is possible to determine the situation where the passenger decreases in concentration to watch the surrounding environment.

According to the present invention, the duration and the degree of acceleration of the acceleration control of the own vehicle can be set appropriately as long as the passenger can bodily sense the acceleration.

Figure 4:
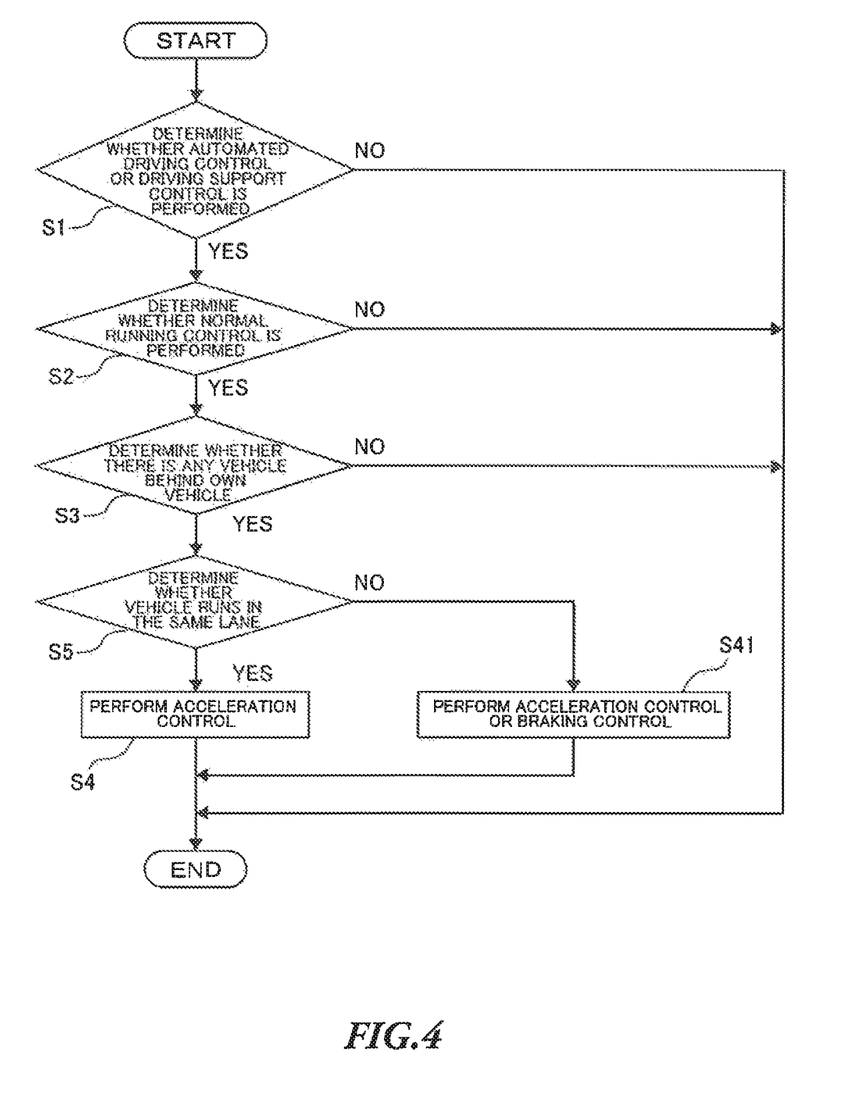
FIG. 4 is a flowchart illustrating a process of control when the alarm apparatus illustrated in FIG. 1 is used under a different running environment.
Figure 5:
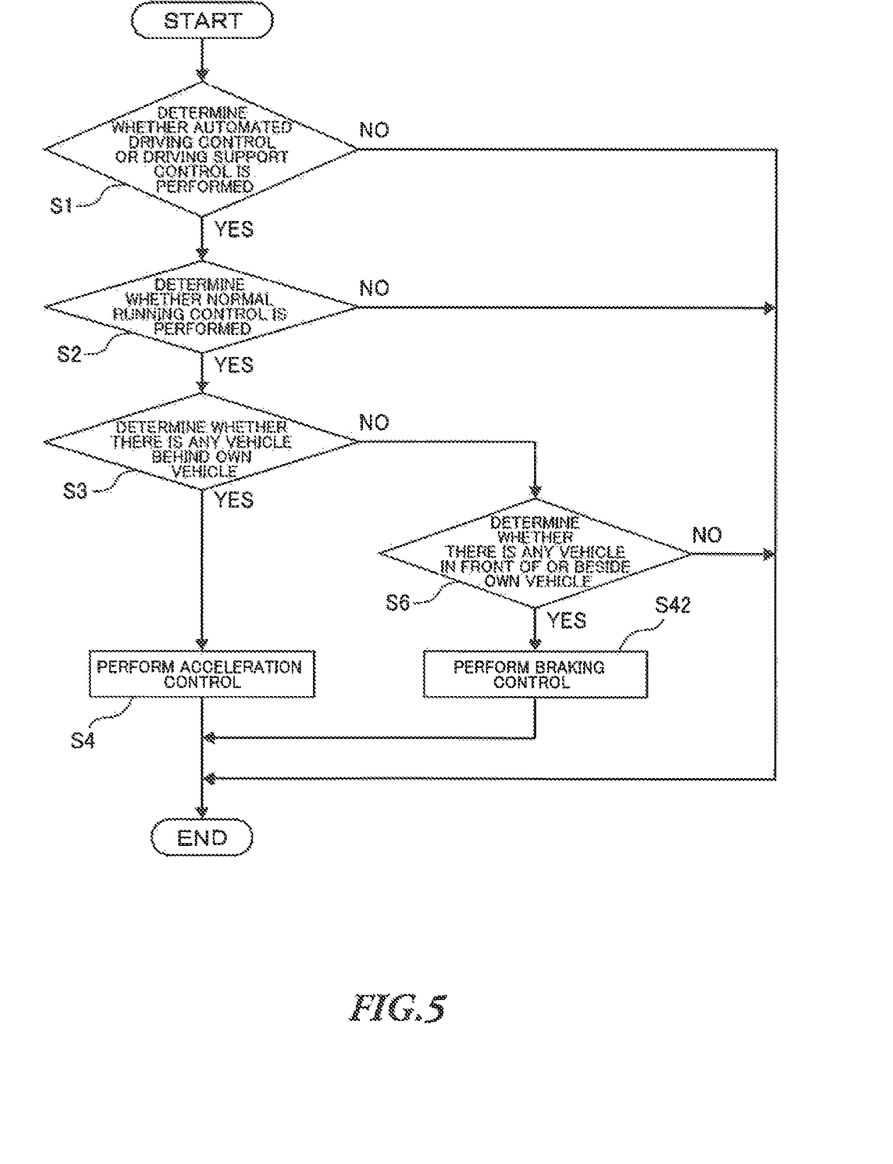
FIG. 5 is a flowchart illustrating a process of control when the alarm apparatus illustrated in FIG. 1 is used under a different running environment.
Figure 6:
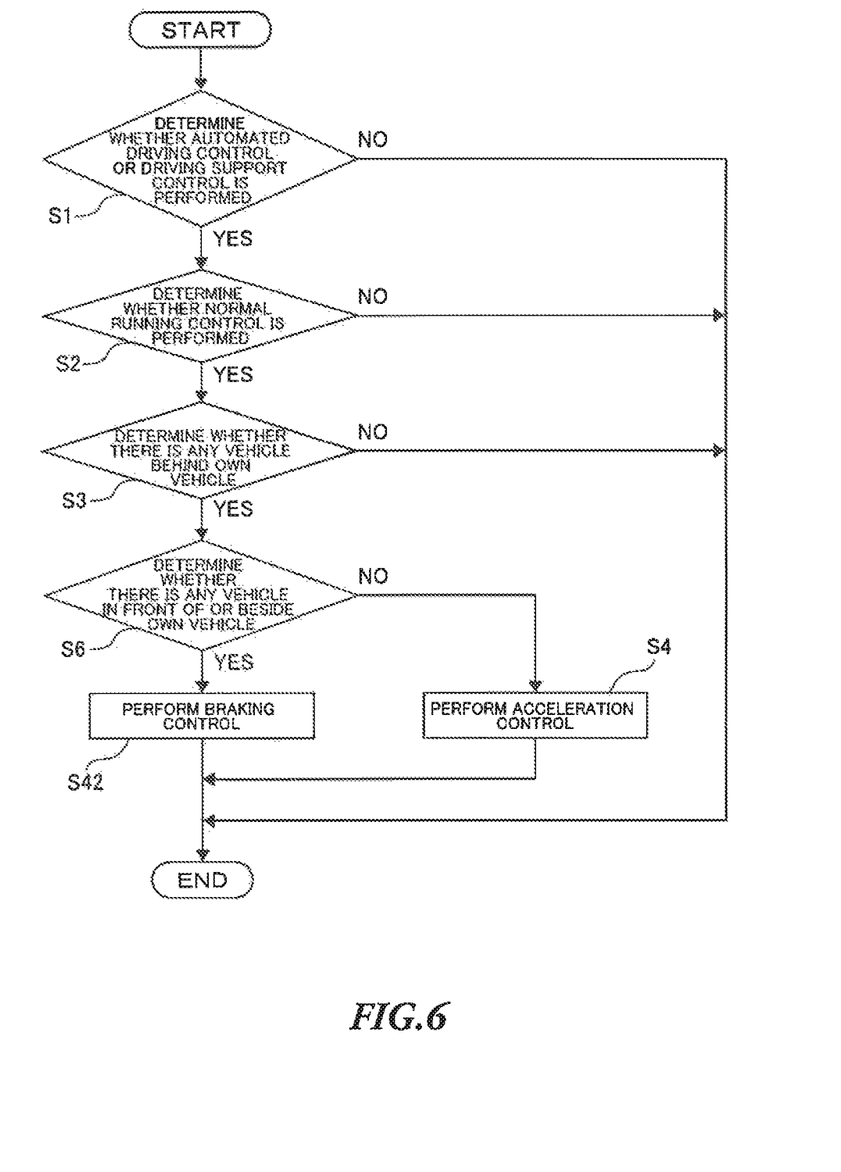
FIG. 6 is a flowchart illustrating a process of control when the alarm apparatus illustrated in FIG. 1 is used under a different running environment.

FIGS. 4 to 6 are flowcharts each illustrating a process of control when the alarm apparatus 1 is used in a different running environment.

In the process illustrated in FIG. 4, the driving controller 10 performs different control for each of the vehicles running behind the own vehicle depending on the lanes in which the vehicles run. In the same way as the process illustrated in FIG. 3, the driving controller 10 determines whether the automatic driving control or the driving support control is performed in the step S1, and determines whether the normal running control is performed in the step S2, and then determines whether there is any vehicle behind the own vehicle in the step S3 as illustrated in FIG. 4.

Next, when the detector 20 detects a vehicle behind the own vehicle, such as the vehicle B, C or D illustrated in FIG. 2 (step S3/YES), the driving controller 10 determines whether the vehicle detected in the step S3 runs in the same lane as the own vehicle (step S5). When the vehicle detected by the detector 20 runs behind the own vehicle in the same lane, as the vehicle B illustrated in FIG. 2, the step moves to the next step (step S5/YES). In this case, the acceleration control is performed (step S4) in the same way as in the process illustrated in FIG. 3. Here, when the vehicle detected by the detector 20 runs in the different lane, as the vehicle C or the vehicle D illustrated in FIG. 2, (step S5/NO), the driving controller 10 performs at least one of the acceleration control or the braking control of the own vehicle (step S41).

By the acceleration control (step S4), and by the acceleration control or the braking control (step S41), it is possible to allow the passenger to bodily sense the acceleration, and therefore to encourage the passenger to recognize the running environment. In a case in which the vehicle behind the own vehicle runs in the same lane, it is easy to switch from the acceleration control to the coping control to avoid the vehicle if the vehicle abnormally approaches the own vehicle. Meanwhile, in a case in which the vehicle runs behind the own vehicle in the different lane, if the vehicle abnormally approaches the own vehicle, the necessity to avoid the vehicle is lower than when the vehicle runs in the same lane, and therefore the acceleration control is not necessarily performed, but the braking control may be performed. In addition, when the vehicle runs behind the own vehicle in the different lane, the driving controller 10 may perform the acceleration control once, and then perform the braking control (the controls may be performed in the reverse order) in order to change the acceleration to allow the passenger to bodily distinguish from when the vehicle runs in the same lane.

Here, the braking control of the own vehicle according to the present invention may include not only decreasing in the speed by using a brake but also cancelling the acceleration control, and cancelling the driving control to maintain a constant speed.

FIG. 5 is a flowchart illustrating a process of different control depending on the positions of other vehicles. In the same way as the process illustrated in FIG. 3, the driving controller 10 determines whether the automatic driving control or the driving support control is performed in the step S1, and determines whether the normal running control is performed in the step S2, and then determines whether there is any vehicle behind the own vehicle in the step S3 as illustrated in FIG. 5.

Next, when the detector 20 detects a vehicle behind the own vehicle, such as the vehicle B, C or D illustrated in FIG. 2 (step S3/YES), the driving controller 10 performs the acceleration control of the own vehicle (step S4).

On the other hand, when there is no vehicle behind the own vehicle (step S3/NO), the driving controller 10 determines whether there is any vehicle in front of, or beside the own vehicle (step S6). When the detector 20 detects a vehicle in front of, or beside the own vehicle, such as the vehicle E or F illustrated in FIG. 2 (step S6/YES), the driving controller 10 performs the braking control of the own vehicle (step S42). The braking control allows the passenger to bodily sense the acceleration due to the braking, and therefore it is possible to encourage the passenger to recognize the running environment. Here, when the detector 20 detects no vehicle behind, in front of, and beside the own vehicle (step S6/NO), the driving controller 10 does not perform the acceleration control and the braking control, but maintains the normal running control, and then ends the process.

With the present example illustrated in FIG. 5, when any vehicle runs in front of, or beside the own vehicle, the driving controller 10 performs the braking control of the own vehicle. By this means, it is possible to switch from the braking control to the coping control to avoid the vehicle in front of the own vehicle, when, in particular, the own vehicle abnormally approaches the vehicle running in front of the own vehicle.

Next, in the process illustrated in FIG. 6, the priority of the controls is set depending on the positions of other vehicles. In the same way as the process illustrated in FIG. 3, the driving controller 10 determines whether the automatic driving control or the driving support control is performed in the step S1, and determines whether the normal running control is performed in the step S2, and then determines whether there is any vehicle behind the own vehicle in the step S3 as illustrated in FIG. 6.

Next, when the detector 20 detects a vehicle behind the own vehicle, such as the vehicle B, C or D illustrated in FIG. 2 (step S3/YES), the driving controller 10 determines whether there is any vehicle in front of or beside the own vehicle (step S6). Here, when the detector 20 detects no vehicle behind the own vehicle (step S3/NO), the process ends.

On the other hand, when the detector 20 detects a vehicle in front of, or beside the own vehicle, such as the vehicle E or F illustrated in FIG. 2 (step S6/YES), the driving controller 10 performs the braking control of the own vehicle (step S42). Meanwhile, the detector 20 detects a vehicle behind the own vehicle, but does not detect any vehicle in front of and beside the own vehicle (step S6/NO), the driving controller 10 performs the acceleration control of the own vehicle (step S4). By this means, the braking control or the acceleration control allows the passenger to bodily sense the acceleration due to the braking control or the acceleration control, and therefore it is possible to encourage the passenger to recognize the running environment.

In the process illustrated in FIG. 6, the control to cope with the vehicle running in front of or beside the own vehicle is preferentially performed over the vehicle running behind the own vehicle. It is because a degree of urgency in the case in which the own vehicle abnormally approaches the vehicle running in front of the own vehicle is higher than that in the case in which the own vehicle abnormally approaches the vehicle running behind the own vehicle. At this time, it is preferred that the braking control is preferentially performed.

Although the example of the present invention has been described, it will be appreciated that the present invention is not limited to the descriptions and drawings of the example. Other examples practiced by persons skilled in the art based on the example, and techniques to use the example are covered by the scope of the present invention.

The invention claimed is:

1. An alarm apparatus to be equipped in a vehicle having a detector, the apparatus comprising a driving controller, the driving controller configured to perform automated driving control or driving support control of the vehicle, and to perform driving control of the vehicle,
   wherein, when the detector of the vehicle detects another vehicle approximately behind the vehicle, the driving controller performs passenger alarm generating acceleration control of the vehicle while the automated driving control or the driving support control is being performed under a normal running mode.

2. The alarm apparatus according to claim 1, wherein, when the detector detects another vehicle behind the vehicle in a same lane, the driving controller performs the acceleration control of the vehicle while the automated driving control or the driving support control is performed.

3. The alarm apparatus according to claim 2, wherein, when the detector detects another vehicle behind the vehicle in a different lane, the driving controller performs at least one of the acceleration control and braking control of the vehicle while the automated driving control or the driving support control is performed.

4. The alarm apparatus according to claim 2, wherein, when the detector detects another vehicle approximately in front of the vehicle or another vehicle beside the vehicle in a different lane, the driving controller performs braking control of the vehicle while the automated driving control or the driving support control is performed.

5. The alarm apparatus according to claim 2, wherein, when the detector detects another vehicle approximately behind the vehicle or approximately in front of the vehicle, the driving controller performs braking control of the vehicle while the automated driving control or the driving support control is performed.

6. The alarm apparatus according to claim 2, wherein, when the vehicle runs in the normal running mode, a risk level determination by the driving controller is deemed below a predetermined threshold as not to require initiation of a protective adjustment by the automated driving control or the driving support control.

7. The alarm apparatus according to claim 2, wherein, when the detector detects a risk factor to be avoided or control to cope with the risk factor is performed while the automated driving control or the driving support control is performed, the driving controller performs control of the vehicle.

8. The alarm apparatus according to claim 2, wherein, when coping control of the vehicle is required to cope with a predetermined object while the automated driving control or the driving support control is performed, the driving controller overrides any prior input as to the passenger alarm generating acceleration control of the vehicle and performs the coping control.

9. The alarm apparatus according to claim 1, wherein, when the detector detects another vehicle behind the vehicle in a different lane, the driving controller performs at least one of the acceleration control and braking control of the vehicle while the automated driving control or the driving support control is performed.

10. The alarm apparatus according to claim 1, wherein, when the detector detects another vehicle approximately in front of the vehicle or another vehicle beside the vehicle in a different lane, the driving controller performs braking control of the vehicle while the automated driving control or the driving support control is performed.

11. The alarm apparatus according to claim 1, wherein, when the detector detects another vehicle approximately behind the vehicle or approximately in front of the vehicle, the driving controller performs braking control of the vehicle while the automated driving control or the driving support control is performed.

12. The alarm apparatus according to claim 1, wherein, when the vehicle runs in the normal running mode, a risk level determination by the driving controller is deemed below a predetermined threshold as not to require initiation of a protective adjustment by the automated driving control or the driving support control.

13. The alarm apparatus according to claim 1, wherein, when the detector detects a risk factor to be avoided or control to cope with the risk factor is performed while the automated driving control or the driving support control is performed, the driving controller performs control of the vehicle.

14. The alarm apparatus according to claim 1, wherein, when coping control of the vehicle is required to cope with a predetermined object while the automated driving control or the driving support control is performed, the driving controller overrides any prior input as to the passenger alarm generating acceleration control of the vehicle and performs the coping control.

15. An alarm apparatus to be equipped in a vehicle having a detector, the apparatus comprising circuitry, the circuitry configured to perform automated driving control or driving support control of the vehicle, and to perform driving control of the vehicle, wherein, when the detector of the vehicle detects another vehicle approximately behind the vehicle, the circuitry performs passenger alarm generating acceleration control of the vehicle while the automated driving control or the driving support control is being performed under a normal running mode.

* * * * *